United States Patent
Tamagawa

(10) Patent No.: US 6,522,778 B1
(45) Date of Patent: Feb. 18, 2003

(54) METHOD OF CONVERTING COLORIMETRIC VALUES, AND COLOR IMAGE OUTPUT APPARATUS

(75) Inventor: Kiyomi Tamagawa, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/264,033

(22) Filed: Mar. 8, 1999

(30) Foreign Application Priority Data

Mar. 11, 1998 (JP) .......................................... 10-060082

(51) Int. Cl.[7] ................................................. G06K 9/00
(52) U.S. Cl. ........................ 382/167; 358/520; 345/601
(58) Field of Search ................................. 382/162, 167; 358/501, 504, 515, 518–523; 345/431, 589–604

(56) References Cited

U.S. PATENT DOCUMENTS

| | | | | |
|---|---|---|---|---|
| 5,481,380 A | * | 1/1996 | Bestmann | 358/523 |
| 5,717,783 A | * | 2/1998 | Endo et al. | 382/167 |
| 6,075,614 A | * | 6/2000 | Ohtsuka et al. | 358/1.9 |
| 6,141,120 A | * | 10/2000 | Falk | 358/504 |
| 6,157,735 A | * | 12/2000 | Holub | 382/167 |
| 6,204,873 B1 | * | 3/2001 | Shimazaki | 382/167 |
| 6,211,973 B1 | * | 4/2001 | Takemoto | 382/167 |
| 6,222,648 B1 | * | 4/2001 | Wolf et al. | 358/504 |

* cited by examiner

Primary Examiner—Jingge Wu
(74) Attorney, Agent, or Firm—Sughrue Mion, PLLC

(57) ABSTRACT

In a color image output apparatus for producing a color proof, even when target gradations corresponding to printing conditions (inks, sheets, and printing press conditions) to be simulated are changed, colorimetric values measured by a first colorimeter for correcting gradation correcting one-dimensional LUTs for the hues R, G, B are converted into desired colorimetric values to enable the color image output apparatus to output desired colors. For using a three-dimensional CM LUT generated by a second colorimeter in order to generate corrective values for the one-dimensional LUTs, there is provided a colorimetric value correcting table for converting output data from the first colorimeter into desired colorimetric values on the second colorimeter.

13 Claims, 12 Drawing Sheets

METHOD OF CONVERTING COLORIMETRIC VALUES, AND COLOR IMAGE OUTPUT APPARATUS

BACKGROUND OF THE INVENTION

1. Field of the Invention

The present invention relates to a method of converting colorimetric values measured by a first colorimeter into colorimetric values measured by a second colorimeter.

The present invention also relates to a color image output apparatus which is capable of correcting, at desired colorimetric values, colorimetric values measured by a built-in colorimeter which is incorporated in a color image output apparatus or colorimetric values measured by an external colorimeter connected on-line to the color image output apparatus to correct colors in three hues C, M, Y that are outputted by the color image output apparatus based on image data in three hues R, G, B inputted to the color image output apparatus.

2. Description of the Related Art

There are known color image output apparatus for producing color images by developing colors in given gradations with colorants in three hues C, M, Y. FIG. 10 of the accompanying drawings schematically shows such a color image output apparatus 1. In the color image output apparatus 1, as shown in FIG. 10, inputted image data in three hues R, G, B, i.e., device-dependent image data R, G, B, are converted in gradation by a lookup table (LUT) unit 5 having gradation-correcting one-dimensional LUTs 2, 3, 4, and the gradation-converted image data R, G, B are supplied to an exposure unit 6.

In the exposure unit 6, three laser diodes (not shown) are energized by the gradation-converted image data R, G, B from the LUT unit 5 to emit respective laser beams L in R, G, B. The laser beams L in R, G. B are applied to a film F to form a latent image on the film F. The latent image formed on the film F is then developed into a visible color image whose colors are expressed by three hues C, M, Y.

The color image output apparatus 1 is used as a proofer for a color printing press, for example. The color image output apparatuse 1 is used as a proofer because a color proof with a color image needs to be made for proofreading before an actual color print is produced by a color printing press such as a rotary press and also because such a proofer is capable of easily producing a plurality of color proofs, i.e., hard copies with color images thereon, in a short period of time as it does not require press plates which would be needed by color printing presses.

Therefore, the colors of a color print to be produced by a color printing press which will be used can be simulated with a color proof produced by the color image output apparatus 1, so that they can easily be confirmed prior to being actually printed.

The gradation-correcting one-dimensional LUTs 2, 3, 4, which are stored in a memory in the color image output apparatus 1, are prepared so as to meet standard printing conditions including inks, sheets, and printing press conditions. However, it is impossible for the gradation-correcting characteristics (also referred to as "gradation characteristics") of the one-dimensional LUTs 2, 3, 4 to be in full accord with the desired printing conditions of the printing press that is going to be actually used. For generating a color proof depending on the desired printing conditions, therefore, it is necessary to correct the gradation characteristics of the one-dimensional LUTs 2, 3. 4 depending on the desired printing conditions.

Specifically, if target gradations (target density gradations) for the hues C, M, Y on the film F with respect to the inputted image data R, G, B are set respectively to target gradations (target density gradations) Dc0, Dm0, Dy0 depending on the desired printing conditions, as shown in FIG. 11 of the accompanying drawings, then it is necessary to correct the standard gradation characteristics of the one-dimensional LUTs 2, 3, 4 which have been stored in advance to meet the standard printing conditions, so that the target gradations Dc0, Dm0, Dy0 will be achieved from the inputted image data R, G, B by the one-dimensional LUTs 2, 3, 4.

According to a gradation correcting process employed in the conventional color image output apparatus 1, as shown in FIG. 12 of the accompanying drawings, the image data R, G, B are incremented by respective given gradations, and then supplied through the standard one-dimensional LUTs 2, 3, 4 that have originally been incorporated in the color image output apparatus 1 to the exposure unit 6, which emit laser beams L in R, G, B to output monochromatic patches in the respective hues C, M, Y on the film F in step S1. Then, the patches in C, M, Y are measured for respective densities Dc, Dm, Dy thereof in step S2.

The measured densities Dc, Dm, Dy are then compared with the respective target gradations Dc0, Dm0, Dy0 shown in FIG. 11, and density differences therebetween are outputted in step S3. Thereafter, it is decided whether the density differences fall in a desired difference range or not in step S4.

Since the desired printing conditions are usually different from the standard printing conditions, the density differences usually do not fall in the desired difference range in step S4. The association (conversion relationship) between the image data R, G, B inputted to the one-dimensional LUTs 2, 3, 4 and the image data R, G, B outputted from the one-dimensional LUTs 2, 3, 4 is corrected on a trial-and-error basis depending on the density differences for thereby correcting the one-dimensional LUTs 2, 3, 4 in step S5. Hereinafter, the association (conversion relationship) means, e.g., both of the relationship converting the inputted image data into the outputted image data and relationship inversely converting the outputted image data into the inputted image data.

The loop of steps S1–S5 is repeated until the density differences fall in the desired difference range in step S4. When the density differences fall in the desired difference range in step S4, i.e., when the measured densities Dc, Dm, Dy differ from the respective target gradations Dc0, Dm0, Dy0 within the desired difference range, the one-dimensional LUTs 2, 3, 4 are properly corrected in gradation.

The above gradation correcting process employed in the conventional color image output apparatus 1, however, is time-consuming for the reason that since the gradation characteristics, which represent the association between the inputted and outputted image data, of the one-dimensional LUTs 2, 3, 4, are corrected on a trial-and-error basis, patches in C, M, Y need to be printed and measured for respective densities Dc, Dm, Dy each time the one-dimensional LUTs 2, 3, 4 are corrected depending on the density differences. In addition, the user of the color image output apparatus 1 has to be highly skilled in determining how much the one-dimensional LUTs 2, 3, 4 need to be corrected, i.e., corrective quantities for the one-dimensional LUTs 2, 3, 4, on the basis of the density differences.

The above problems may be solved by a process which will be described below. Inasmuch as the process is a novel process, it will be described briefly below and will subsequently be described in more detail with respect to an embodiment of the present invention.

According to this process, first, target gradations (referred to as "target colorimetric values") are established such that a gray balance will be achieved by the color image output apparatus 1 when the image data R, G, B outputted by the color image output apparatus 1 are equal to each other, i.e., R=G=B (stated otherwise, when the inputted image data R, G, B pass through the one-dimensional LUTs 2, 3, 4 without being changed thereby i.e., the inputted and outputted image data of these LUTs 2, 3, 4 are in a 1:1 correspondence). Then, the color image output apparatus 1 outputs a color chart having color patches which represent equal image data R, G, B, respectively. The color patches are then colorimetrically measured, and a three-dimensional color-matching lookup table (hereinafter referred to as "three-dimensional CM LUTE") for converting colorimetric values into R, G, B values is generated from the measured colorimetric values of the color patches. Then, using the one-dimensional LUTs 2, 3, 4, a gray balance is produced by the color image output apparatus 1 from the inputted image data R, G, B which are equal to each other, i.e., R=G=B, and colorimetrically measured to produce colorimetric values (referred to as "measured colorimetric values"). R, G, B values corresponding to the measured colorimetric values and the target colorimetric values are determined by way of volume interpolation by referring to the three-dimensional CM LUT. The differences between the R, G, B values thus determined are added respectively to the one-dimensional LUTS 2, 3, 4 for thereby correcting the one-dimensional LUTs 2, 3, 4.

Since the above process can determine automatically, not on a trial-and-error basis, corrective quantities for the one-dimensional LUTs 2, 3, 4, the one-dimensional LUTs 2, 3, 4 can be corrected accurately in a short period of time normally by one cycle of operation.

According to this process, however, the measured colorimetric values may be produced by a colorimeter (hereinafter referred to as "first colorimeter" to be corrected) incorporated in the color image output apparatus 1, and another colorimeter (hereinafter referred to as "second colorimeter" serving as a reference colorimeter) may be used to generate the three-dimensional CM LUT.

The reasons for using such two colorimeters are as follows: For generating the three-dimensional CM LUT, since a great number of color patches need to be measured, a relatively large and expensive colorimeter capable of two-dimensional measurement (surface measurement) is used by a manufacturer of the color image output apparatus 1, and for correcting the one-dimensional LUTs 2, 3, 4, a relatively small and inexpensive colorimeter capable of spot measurement (point measurement) is used as a built-in colorimeter in the color image output apparatus 1. The color image output apparatus 1 which incorporates the first colorimeter has a memory which stores the three-dimensional CM LUT that has been generated using the second colorimeter. The user of the color image output apparatus 1 operates the first colorimeter, i.e., the built-in colorimeter in the color image output apparatus 1, to correct the one-dimensional LUTs 2, 3, 4.

Generally, colorimetric values measured of one gray chart vary from colorimeter to colorimeter. Even though the one-dimensional LUTs 2, 3, 4 are corrected in order to convert output image data thereof into the target R, G, B values, using the three-dimensional CM LUT, the colorimetric values produced by the first and second colorimeters remain different from each other, i.e., an error due to the different types of the colorimeters remains unremoved, resulting in a failure to achieve a full color match. Therefore, the above novel process still requires the one-dimensional LUTs 2, 3, 4 to be corrected by fine adjustment to intentionally shift the gradation characteristics representative of the association between the image data inputted to and outputted from the one-dimensional LUTs 2, 3, 4 after one cycle of correcting operation, for thereby enabling the color image output apparatus 1 to output desired colors.

SUMMARY OF THE INVENTION

It is therefore an object of the present invention to provide a method of converting colorimetric values measured by a first colorimeter into colorimetric values measured by a second colorimeter in order to, for example, be able to correct one-dimensional LUTs for respective three hues, which serve to make gradation adjustments to enable the color image output apparatus to output desired colors, within a short period of time without the need for correction by way of fine adjustment, even if a colorimeter incorporated in the color image output apparatus or a first colorimeter provided outside and connected on-line to the color image output apparatus and a colorimeter used to generate a three-dimensional CM LUT are different from each other.

Still another object of the present invention is to provide a color image output apparatus which is capable of correcting, at desired colorimetric values, colorimetric values measured by a built-in colorimeter which is incorporated in a color image output apparatus or colorimetric values measured by an external colorimeter connected on-line to the color image output apparatus to correct colors in three hues C (Cyan), M (Magenta), Y (Yellow) that are outputted by the color image output apparatus based on image data in hues R, G, B inputted to the color image output apparatus.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 10:
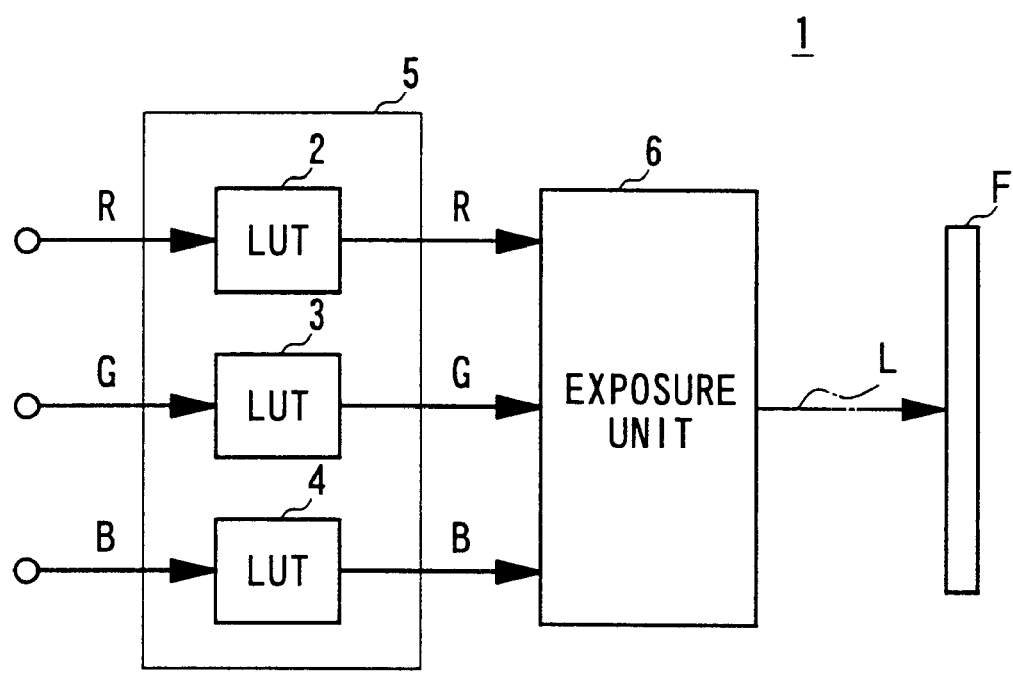
FIG. 10 is a block diagram of a conventional color image output apparatus.
Figure 11:
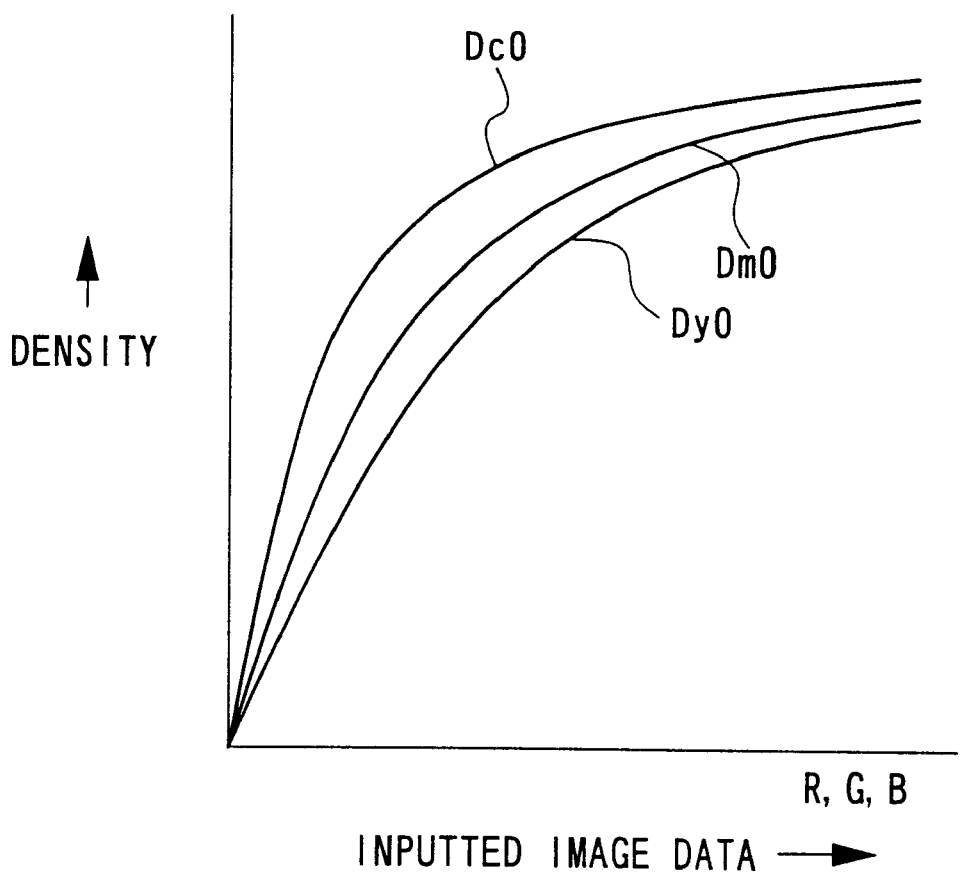
FIG. 11 is a diagram of target gradations to be achieved by corrected one-dimensional LUTs in the conventional color image output apparatus.
Figure 12:
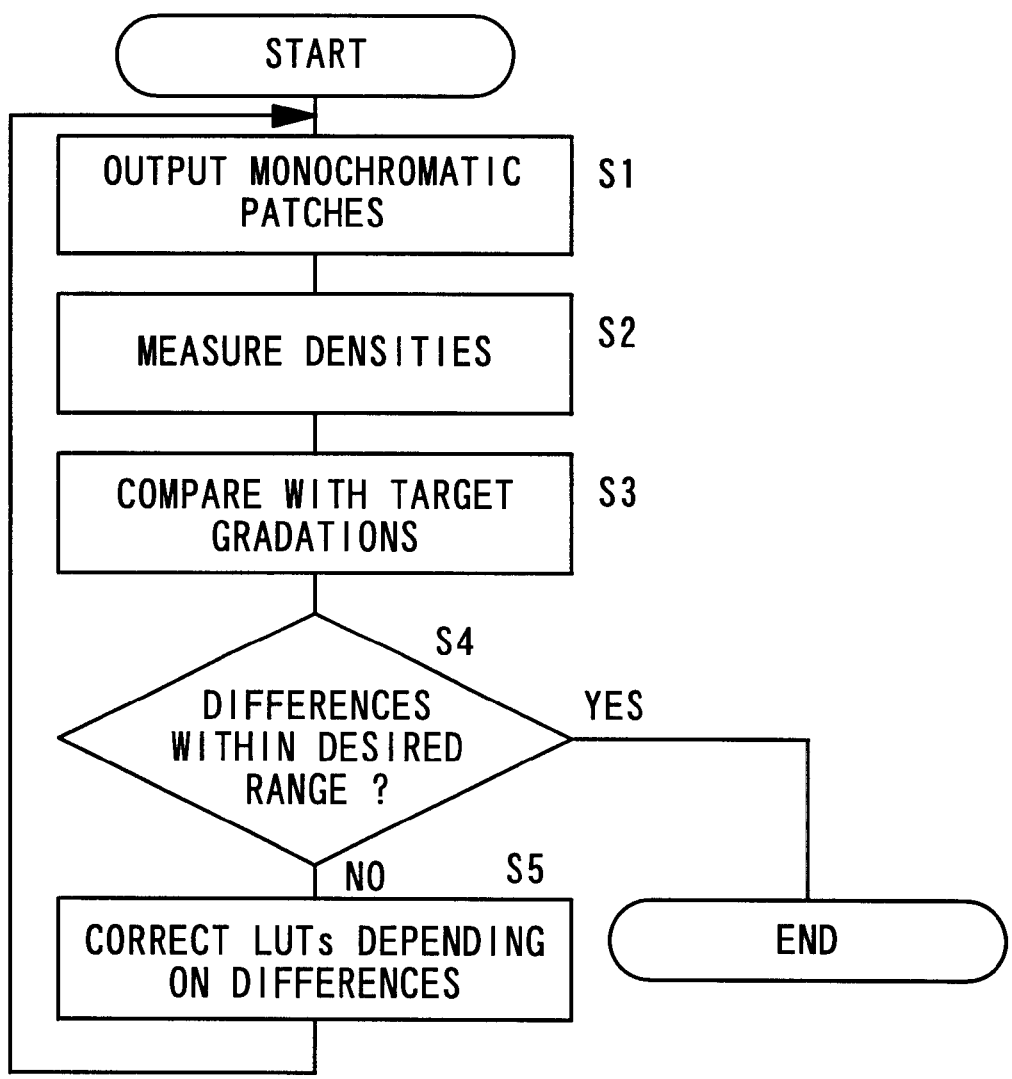
FIG. 12 is a diagram illustrative of a process of correcting the one-dimensional LUTs in the conventional color image output apparatus.

An embodiment of the present invention will be described below with reference to FIGS. 1 through 9. Those parts shown in FIGS. 1 through 9 which are identical to those shown in FIGS. 10 through 12 denoted by identical reference characters.

Figure 1:
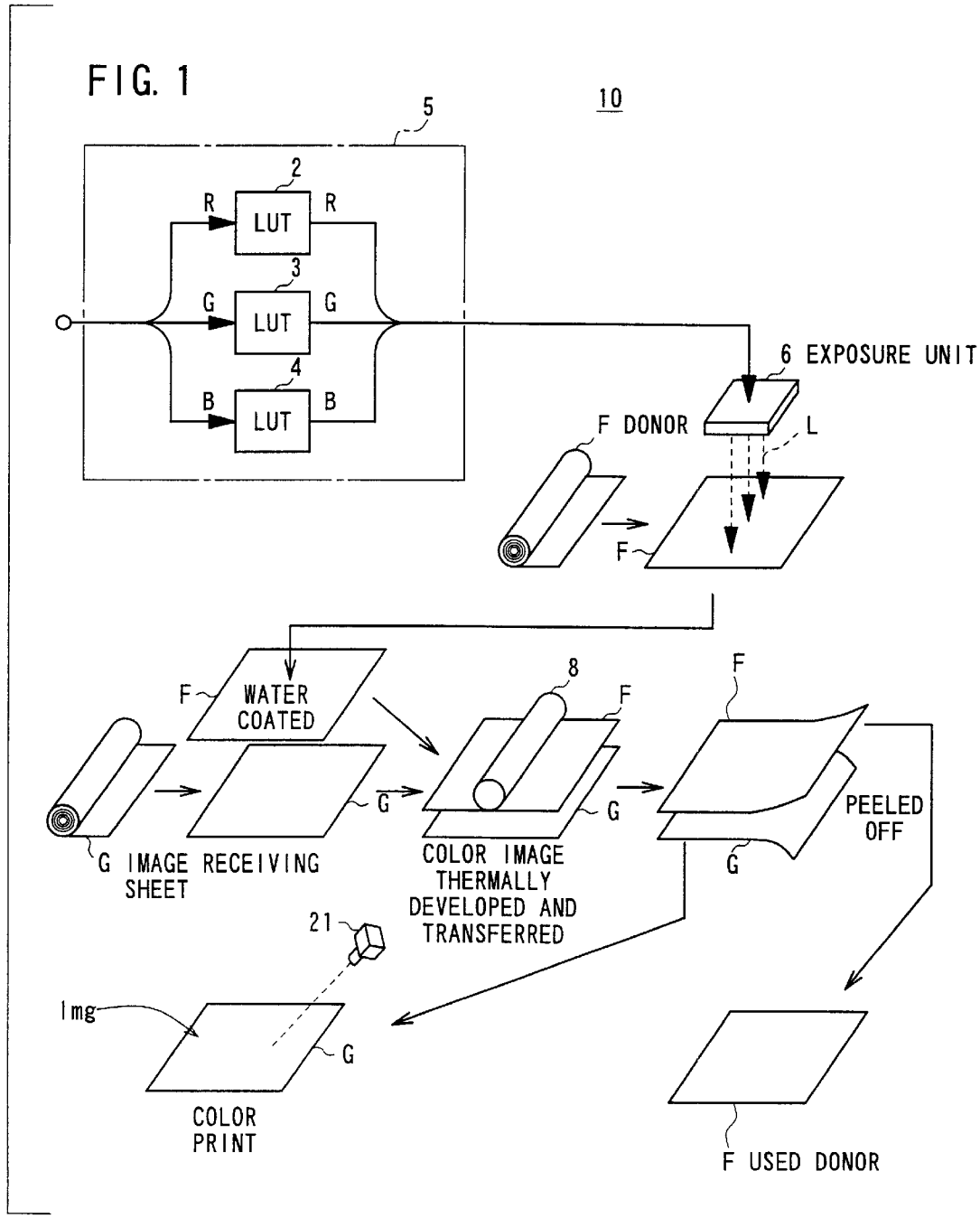
FIG. 1 is a schematic perspective view, partly in block form, of a color image output apparatus according to the present invention.

FIG. 1 schematically shows a color image output apparatus 10 such as a color printer or the like according to the present invention. The color image output apparatus 10 has an exposure unit 6 for emitting laser beams L in R, G, B. The exposure unit 6 is supplied with a donor film F in the form of a sheet of given length which has been cut off by an internal cutter (not shown) from a rolled donor film F of a photosensitive material.

The laser beams L emitted from the exposure unit 6 are applied to the donor film F to form a latent image thereon. The donor film F with the latent image thereon is coated with dampening water, and an image receiving sheet G cut off from a roll thereof is placed in facing relation to and held against the donor film F.

The donor film F and the image receiving sheet G that are held against each other are delivered to a thermal developing and fixing unit, in which they are heated by a heating roller 8. When heated by the heating roller 8, the latent image is developed into a visible image, and the dyes of the image on the donor film F are transferred and fixed to the image receiving sheet G. After the visible image has been transferred to the image receiving sheet G, the donor film F and the image receiving sheet G are peeled off from each other. The image receiving sheet G is finished as a color print G carrying a high-quality color image Img represented by three hues C, M, Y.

The color image Img on the color print G corresponds to image data in three hues R, G, B (device-dependent image data) that are supplied to the exposure unit 6 from a lookup table (LUT) unit 5 as gradation-correcting means. The image data R, G. B supplied to the exposure unit 6 have been converted from inputted image data in three hues R, G, B (device-dependent image data) by LUTs 2, 3, 4 as one-dimensional gradation-correcting means (one-dimensional conversion tables) which have been generated in advance on the basis of standard printing conditions.

If a color proof is to be generated by the color image output apparatus 10 under printing conditions (also referred to as "desired printing conditions" or "target printing conditions") which are different from the standard printing conditions for the LUTs 2, 3, 4 that are stored in a memory in the color image output apparatus 10, then it is necessary to correct the standard gradation characteristics of the LUTs 2, 3, 4 that are stored in the memory in the color image output apparatus 10.

In order to determine how much the gradation characteristics of the LUTs 2, 3, 4 are to be corrected, i.e., corrective quantities for the one-dimensional LUTs 2, 3, 4, the color image output apparatus 10 has incorporated therein a colorimeter (hereinafter referred to as "first colorimeter" to be corrected) 21 for measuring colorimetric values of the color image Img on the color print G. However, the first colorimeter 21 may be replaced with a first colorimeter 21A provided outside of the color image output apparatus 10 and connected on-line thereto, without being incorporated therein (see FIG. 2).

In this embodiment, the exposure unit 6 may be referred to as an exposure recording unit if it carries out a process ranging from the exposure of the donor film F to the laser beams L to the generation of the color print G from the donor film F.

Figure 2:
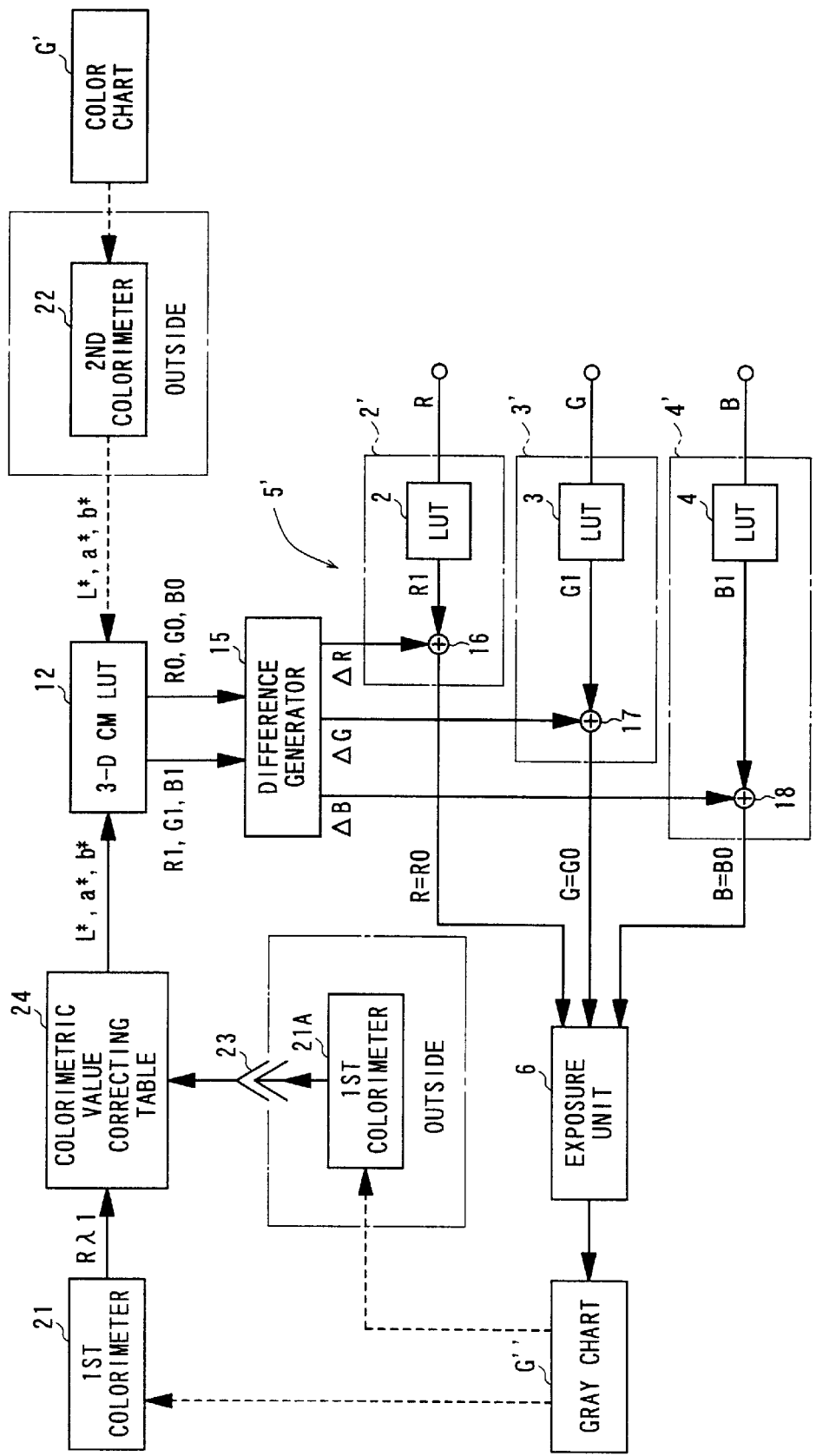
FIG. 2 is a block diagram illustrative of a procedure for correcting one-dimensional LUTs.

FIG. 2 shows in block form the color image output apparatus 10 which has a colorimetric value correcting table (also referred to as "colorimetric value correcting means", "colorimetric value converting table", or "colorimetric value converting means") 24 stored in the memory for correcting a measurement difference or error (colorimeter type difference) between the first colorimeter 21 to be corrected which is incorporated as a built-in colorimeter in the color image output apparatus 10 or the first colorimeter 21A to be corrected which is provided as an external colorimeter connected on-line to the color image output apparatus 10 and an external reference colorimeter (hereinafter referred to as "second colorimeter") 22 which is connected off-line to the color image output apparatus 10. The color image output apparatus 10 also has a three-dimensional color-matching LUT (hereinafter referred to as "three-dimensional CM LUT") 12 stored in the memory.

A procedure for generating the three-dimensional CM LUT 12, a procedure for generating the colorimetric value correcting table 24, and a procedure for correcting the one-dimensional LUTs 2, 3, 4 using the three-dimensional CM LUT 12 and the colorimetric value correcting table 24 which have been generated will successively be described below.

First, the procedure for generating the three-dimensional CM LUT 12 will be described with reference to FIGS. 2 through 6.

Figure 3:
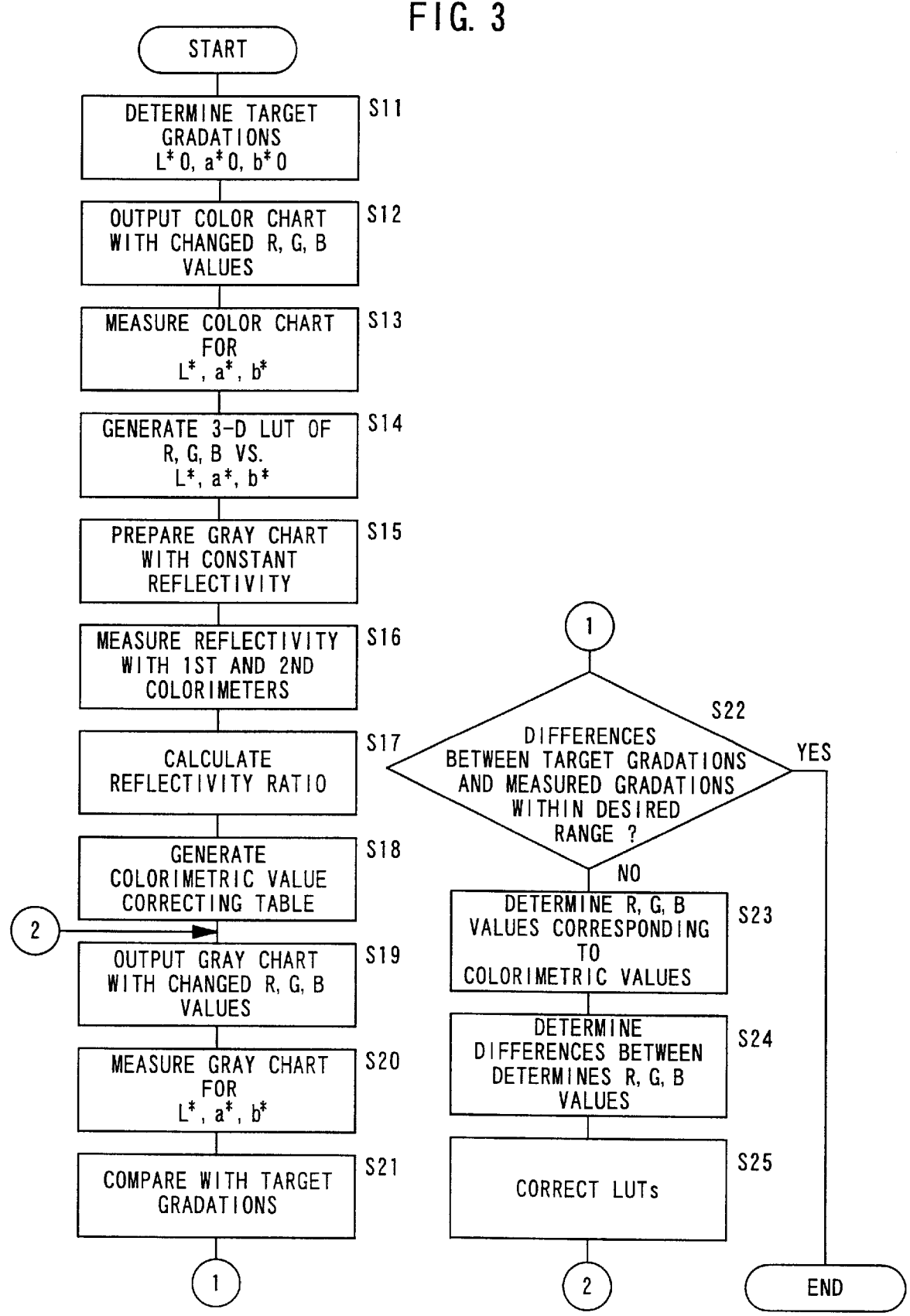
FIG. 3 is a flowchart of various procedures carried out by the color image output apparatus according to the present invention.

Target gradations (target density gradations) Dt (see FIG. 4) depending on target printing conditions of a color printing press which is going to be actually used are determined in step S11 (see FIG. 3). The target gradations Dt are established such that a gray balance will be achieved by the color image output apparatus 10 when outputted image data R, G, B (gradations of the hues R, G, B) are equal to each other, i.e., R=G=B (the outputted image data R, G, B are image data outputted from the one-dimensional LUTs 2, 3, 4 and inputted image data R, G, B are image data inputted to the one-dimensional LUTs 2, 3, 4). The target gradations Dt are represented by colorimetric values (target colorimetric values) L*0, a*0, b*0 in a CIELAB color space, for example.

Figure 4:
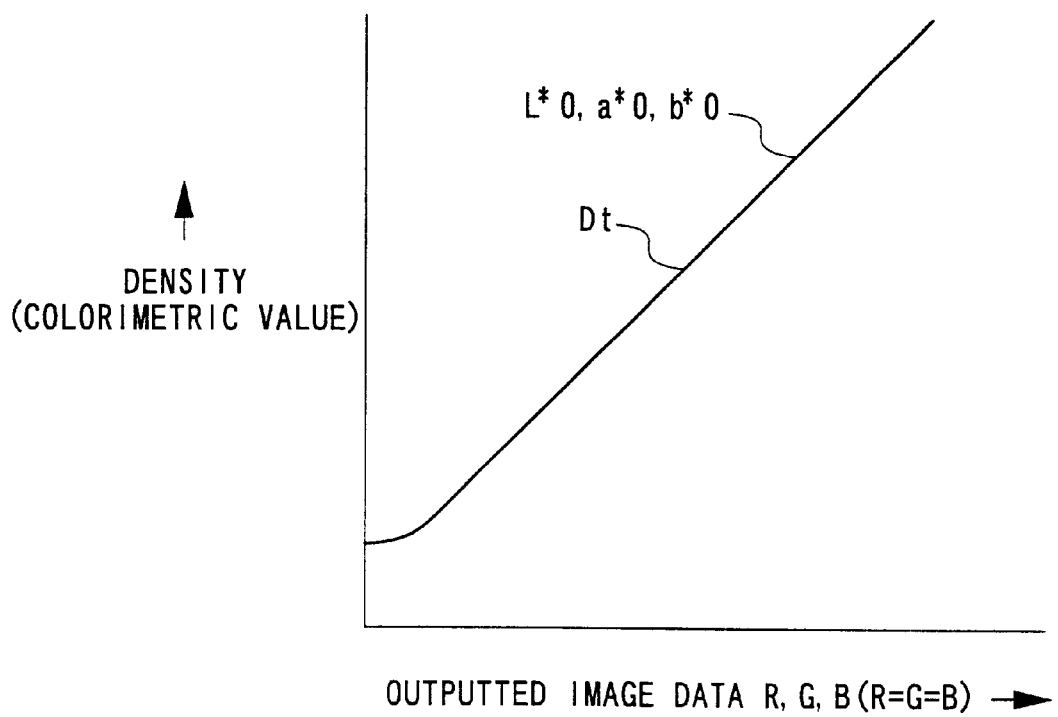
FIG. 4 is a diagram showing target gradations.

The association between colorimetric values and densities can be determined by measuring a plurality of patches having different densities with a colorimeter and a densitometer, and determining densities with respect to arbitrary colorimetric values L*, a*, b* by way of volume interpolation. Actually, the target gradations Dt can be obtained by measuring the relationship of halftone dot % values vs. densities of a print produced by a color printing press which is going to generate a color proof, and converting the halftone dot % values into output image data R, G, B. In FIG. 4, when the output image data R, G, B are R=G=B=0, the target gradations Dt have certain densities because of the color of the sheet of the print produced by the color printing press.

Then, in order to generate a three-dimensional CM LUT 12 representing the association for converting colorimetric values outputted by the color image output apparatus 10 into R, G, B values of outputted image data R, G, B, the color image output apparatus 10 outputs a color chart G' (see FIG. 2), which is a color print G having color patches which represent substantially equally spaced R, G, B values of outputted image data R, G, B, respectively, while the inputted image data R, G, B pass through the one-dimensional LUTs 2, 3, 4 without being changed thereby, i.e., the inputted and outputted image data of these LUTs 2, 3, 4 are in a 1:1 correspondence. For example, if each of the R, G, B values of outputted image data R, G, B has 8-bit gradations ranging from 0 to 255, then the color image output apparatus 10 outputs a color chart G' having a total of $9^3=729$ color patches, with 9 uniformly spaced gradation levels for each of the hues R, G, B at gradation intervals of $3^3$. In the vicinity of a gray where R=G=B on the color chart, the number of divided color patches is twofold because interpolating grids are made smaller in the vicinity of a gray where the human visual identification ability is better, for thereby increasing the conversion accuracy of a three-dimensional CM LUT 12 which represents the association for converting outputted colorimetric values outputted image data R, G, B.

Then, the color patches of the outputted color chart G' are measured for colorimetric values $L^*, a^*, b^*$ thereof by the second colorimeter 22 in step S13, and a three-dimensional CM LUT 12 which represents the association of R, G, B values vs. colorimetric values $L^*, a^*, b^*$ for each of the color patches is generated from the colorimetric values $L^*, a^*, b^*$ in step S14.

Figure 5:
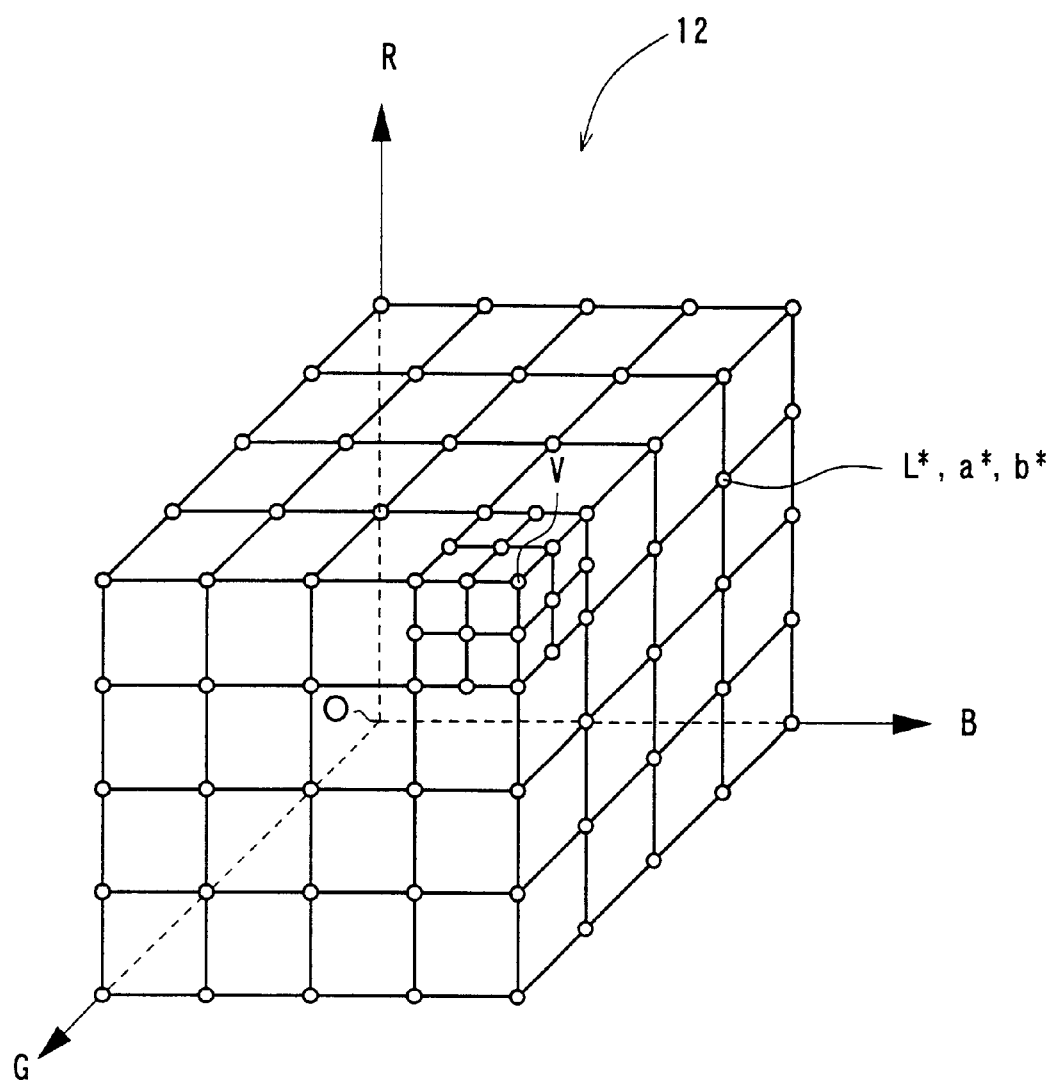
FIG. 5 is a diagram of a three-dimensional CM LUT for changing colorimetric values to R, G, B values.
Figure 6:
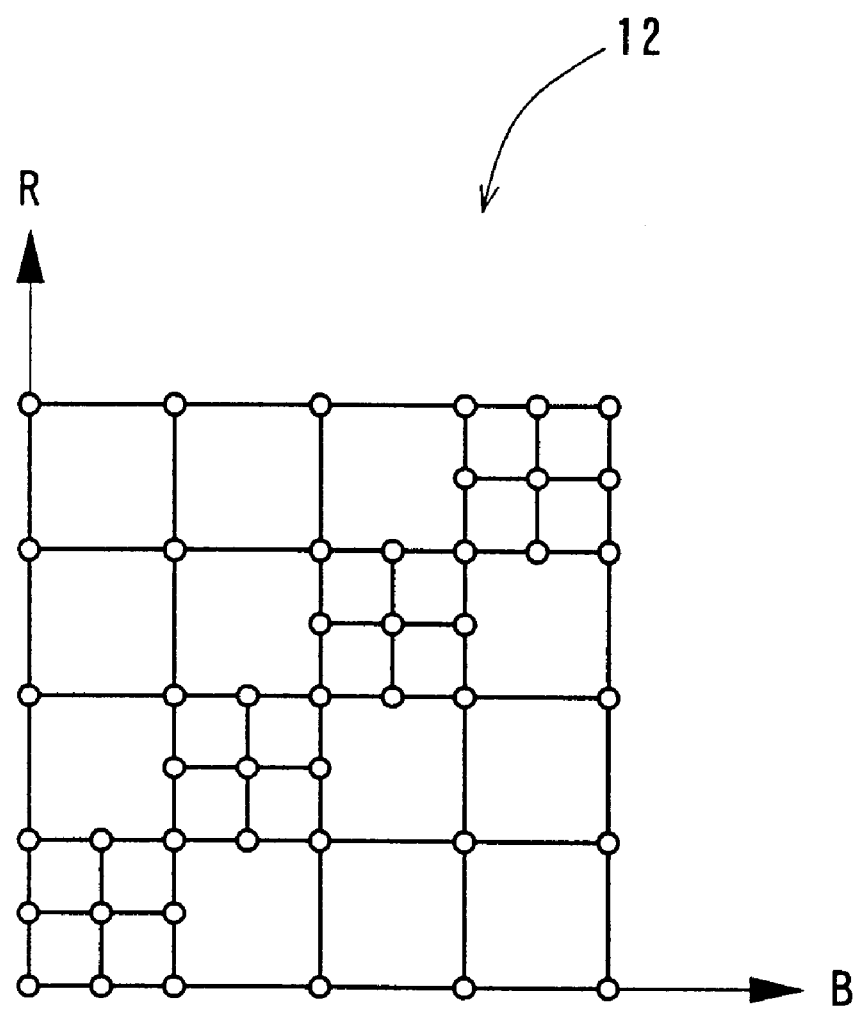
FIG. 6 is a diagram showing smaller grid intervals in the vicinity of a gray in the three-dimensional CM LUT.

FIG. 5 shows $5^3$ measured grid points of the three-dimensional CM LUT 12 by omitting some of $9^3$ grid points representing the measured colorimetric values of the $9^3=729$ color patches for the sake of brevity. The grid points, each represented by a small circle, correspond to points having colorimetric values $L^*, a^*, b^*$ measured by the second colorimeter 22. Since the grid points (colorimetrically measured points) are measured at smaller intervals in the vicinity of regions where R=G=B as described above, each cubic grid containing a line segment interconnecting the origin O of an RGB coordinate system and a vertex V remotest from the origin 0 on a cube representing the three-dimensional CM LUT 12 shown in FIG. 5 includes grid points spaced at smaller intervals. For example, on a plane defined by the image data R and the image data G, as shown in FIG. 6, the colorimetric values $L^*, a^*, b^*$ are measured at smaller intervals in the vicinity of regions where R=B as the image data G increases. In this manner, the three-deminsional CM LUT 12 which represents the association of the output image data R, G, B vs. the colorimetric values $L^*, a^*, b^*$ measured by the second colorimeter 22 can be generated.

Then, the procedure for generating the colorimetric value correcting table 24 for equalizing colorimetric values measured by the first colorimeter 21 (21A) to be corrected with colorimetric values measured by the second colorimeter 22 will be described below with reference to FIGS. 2, 3, and 7.

Figure 7:
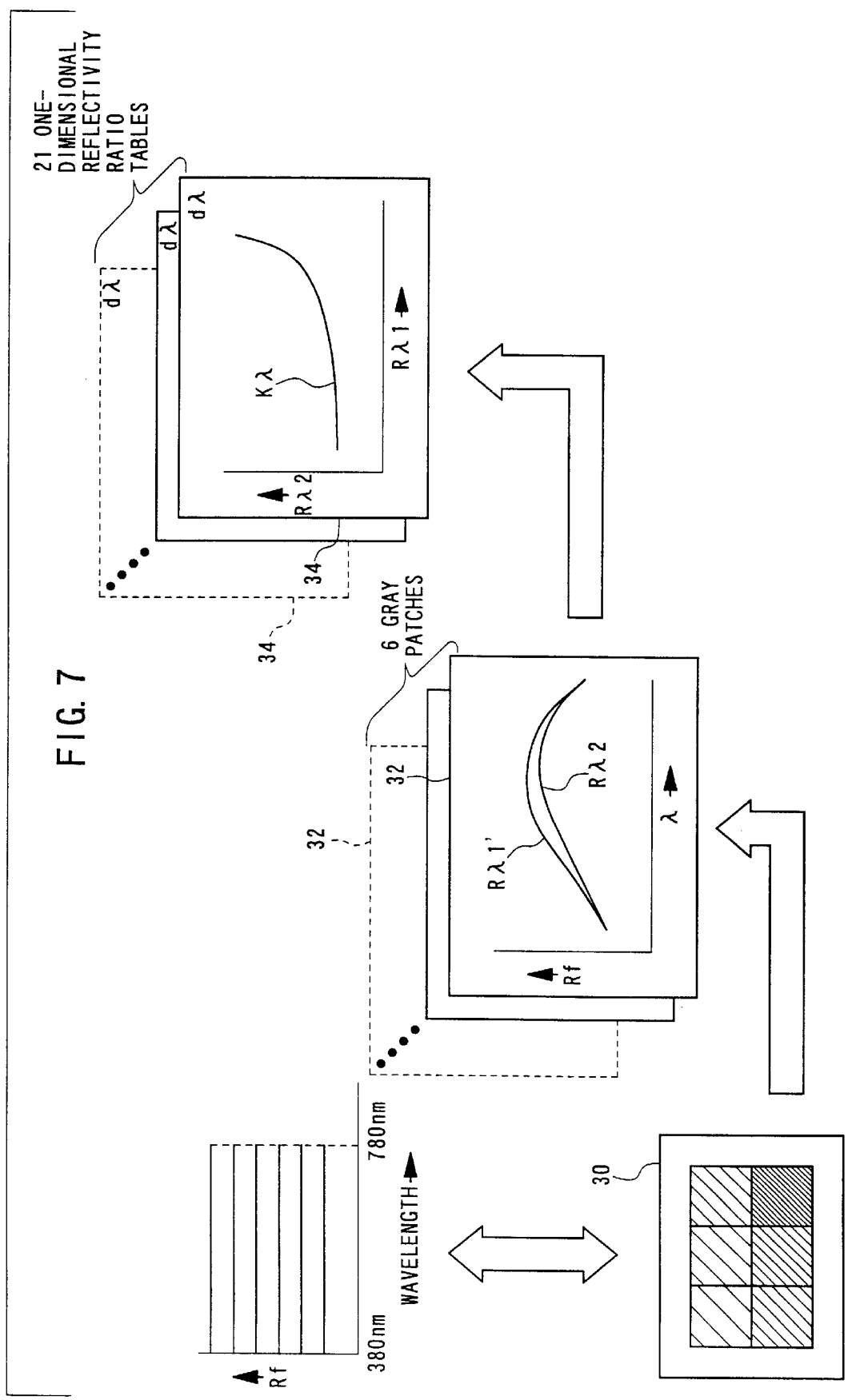
FIG. 7 is a diagram illustrative of a process of determining the ratio of reflectivities measured by a first colorimeter (a colorimeter to be corrected) and a second colorimeter (a reference colorimeter)

As shown in FIG. 7, there is prepared a gray chart 30 having several (six in this embodiment) gray patches kept within a visible wavelength range from 380 to 780 nm, having a constant reflectivity Rf irrespective of the wavelength, and ranging from a nearly highlighted to a nearly solid patch, in step S15.

Then, the reflectivity of the gray patches of the gray chart 30 is measured by the first colorimeter 21 (21A) to be corrected, which may be a colorimeter of the spectral reflectance type, for example, and the second colorimeter 22, which may also be a colorimeter of the spectral reflectance type, for example, at given wavelength intervals dλ (dλ=20 nm in this embodiment) in the above visible wavelength range in step S16. It is assumed that the reflectivity measured by the first colorimeter 21 (21A) to be corrected is represented by Rλ1', and the reflectivity measured by the second colorimeter 22 is represented by Rλ2. As shown in FIG. 7, as many reflectivity measurement tables 32 as the number of the gray patches, i.e., six reflectivity measurement tables 32, are produced, each representing the reflectivity Rλ1' measured by the first colorimeter 21 (21A) and the reflectivity Rλ2 measured by the second colorimeter 22 within the visible wavelength range.

Thereafter, tables (referred to as "one-dimensional reflectivity ratio tables") 34 representing measured reflectivity ratios (also referred to as "colorimeter correction values") Kλ (Kλ=Rλ2/Rλ1') at the wavelength intervals dλ are produced by referring to the reflectivity measurement tables 32 in step S17. In this embodiment, since each of the wavelength intervals dλ is dλ=20 nm, the of one-dimensional reflectivity ratio tables 34 that are produced is 21 {(780–380)/20 +1=21}.

Then, colorimetric values X, Y, Z are determined in terms of colorimetry according to the following equations (1):

$$X=k\int(x\lambda\cdot K\lambda\cdot R\lambda 1\cdot S\lambda)d\lambda$$

$$Y=k\int(y\lambda\cdot K\lambda\cdot R\lambda 1\cdot S\lambda)d\lambda$$

$$Z=k\int(z\lambda\cdot K\lambda\cdot R\lambda 1\cdot S\lambda)d\lambda \qquad (1)$$

where k is a standardization coefficient which is a constant, Kλ the colorimeter correction values, xλ, yλ, zλ color matching functions, Sλ the spectral power distribution of the observation light source used to observe a printed sample such as the color chart G' and gray chart 30, and Rλ1 (described later on) the reflectivity measured of a given gray chart (described later on) by the first colorimeter 21 (21A). The integration range in the equations (1) is from 380 nm to 780 nm.

The colorimetric values X, Y, Z thus determined can uniquely converted mathematically into colorimetric values $L^*, a^*, b^*$ in the CIELAB color space in terms of colorimetry. From the equations (1) and the association for converting the colorimetric values X, Y, Z into the colorimetric values $L^*, a^*, b^*$, the colorimetric value correcting table 24 is generated which is capable of converting (correcting) the measured reflectivity Rλ1 which is a value outputted by the first colorimeter 21 (21A) into colorimetric values $L^*, a^*, b^*$ on the second colorimeter 22 in step S18.

Thus, the colorimetric value correcting table 24 which is capable of converting values measured by the first colorimeter 21 or the first colorimeter 21A into values measured by the second colorimeter 22 is produced in the manner described above.

The procedure for correcting the one-dimensional LUTs 2, 3, 4 using the three-dimensional CM LUT 12 generated in step S14 and the colorimetric value correcting table 24 generated in step S18 will be described below with reference to FIGS. 2, 3, 8, and 9.

First, using the one-dimensional LUTs 2, 3, 4 for the respective hues R, G, B, which are to be corrected, adjusted for a gray balance under the standard printing conditions, the color image output apparatus 10 outputs a gray chart G" (see FIG. 2) that is a color print G produced when R, G, B values are simultaneously changed through 17 steps under the condition that the R, G, B values of the inputted image data R, G, B are equal to each other (R=G=B) (the gray chart G" is a chart carrying a gray scale that includes the background color of the color print G where R=G=B) in step S19.

Then, the reflectivity Rλ of the gray chart G" is measured by the first colorimeter 21 (21A) to be corrected, for each combination of R=G=B at wavelength intervals of 20 nm in the visible wavelength range from 380 nm to 780 nm, and the measured reflectivity Rλ is converted into colorimetric values on the second colorimeter 22. Specifically, the measured reflectivity Rλ is substituted in the equations (1) to produce colorimetric values X, Y, Z, and the colorimetric values X, Y, Z are converted into colorimetric values (referred to as "measured colorimetric values") L*, a*, b* in the CIELAB color space in step S20.

Figure 8:
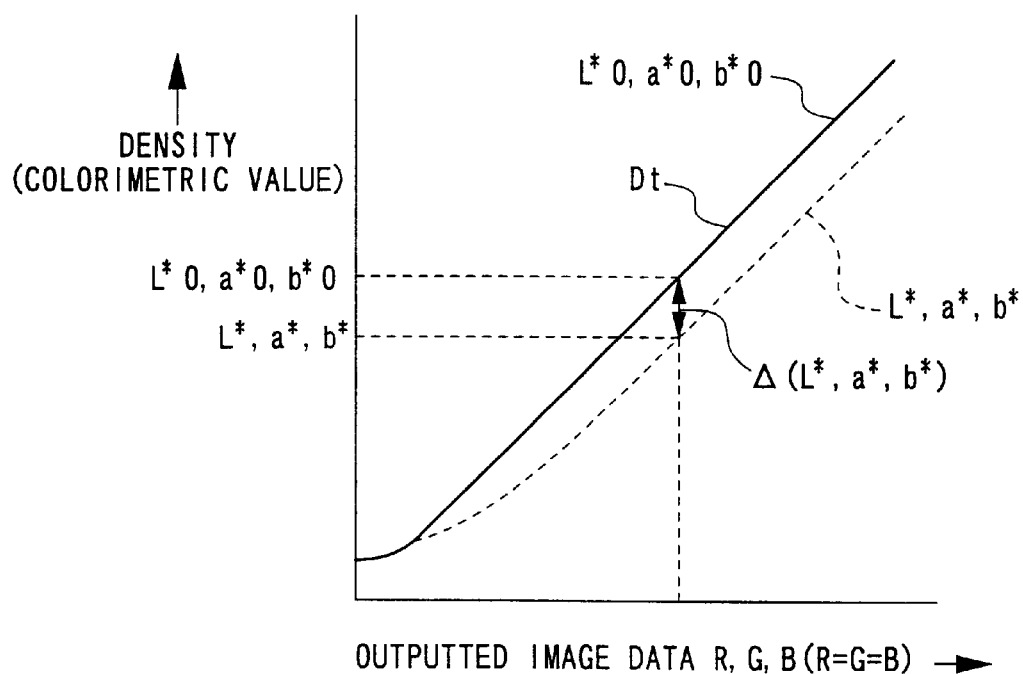
FIG. 8 is a diagram illustrative of the difference between measured colorimetric values and target gradations after output conditions are changed.
Figure 9:
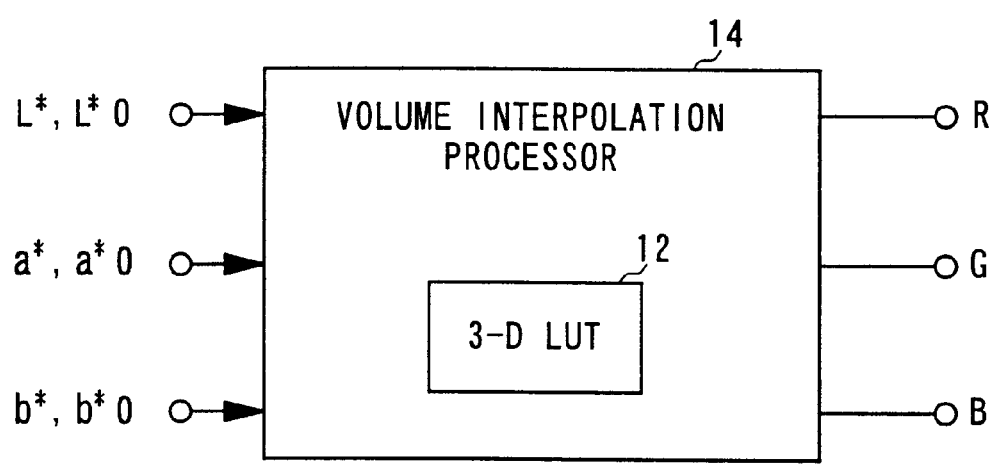
FIG. 9 is a diagram illustrative of the manner in which the three-dimensional CM LUT is used.

Then, as shown in FIG. 8, the measured colorimetric values L*, a*, b* for each combination of R=G=B and the target colorimetric values L*0, a*0, b*0 determined in step S11 are compared with each other in step S21. In FIG. 8, a characteristic curve Dt represents the target gradations (target density gradations) Dt shown in FIG. 4.

Thereafter, it is decided whether differences ΔL*, Δa*, Δb* between the target colorimetric values L*0, a*0, b*0 and the measured colorimetric values L*, a*, b* fall within a desired range or not in step S22. In a first cycle, the differences ΔL*, Δa*, Δb* do not fall within the desired range if the printing conditions have changed.

Using the three-dimensional CM LUT 12 determined in step S14, R, G, B values of outputted image data corresponding to the target colorimetric values L*0, a*0, b* 0 and R, G, B values of outputted image data corresponding to the measured colorimetric values L*, a*, b* are determined in step S23, and then differences between the determined R, G, B values are determined in step S24. Specifically, by referring to the three-dimensional CM LUT 12, interpolating grids (cubic grids) surrounding the target colorimetric values L*0, a*0, b*0 and the measured colorimetric values L*, a*, b* are determined, R, G, B values of the grid points of the cubic grids are read, and R, G, B values of the three hues corresponding to the target colorimetric values L*0, a*0, b*0 and the measured colorimetric values L*, a*, b* are determined by a volume interpolation processor 14 (see FIG. 9), which may comprise a computer or the like, by way of volume interpolation. If the determined R, G, B values corresponding to the target colorimetric values L*0, a*0, b*0 are represented respectively by R0, G0, B0 and the determined R, G, B values corresponding to the measured colorimetric values L*, a*, b* are represented respectively by R1, G1, B1, then the differences between the determines R, G, B values can be determined respectively as ΔR (=R0−R1), ΔG (=G0−G1), ΔB (B0−B1) by a difference generator 15.

Then, based on the differences ΔR, ΔG, ΔB, the one-dimensional LUTs 2, 3, 4 are corrected in step S25. The one-dimensional LUTs 2, 3, 4 can easily be corrected by adding the differences ΔR, ΔG, ΔB to present corrective quantities for the one-dimensional LUTs 2, 3, 4. Specifically, with respect to the R value, for example, as shown in FIG. 2, it is preferable that inputted image data R be converted into outputted image data R1 by the LUT 2 as the predetermined gradation correcting means, and the outputted image data R1 be converted into image data R0 corresponding to the target colorimetric values L*0, a*0, b* 0. Therefore, a new LUT 2' generated when the difference ΔR (=R0−R1) is added as a corrective quantity by an adder 16 may replace the LUT 2 shown in FIG. 1.

The above single calculatory correcting process is effective to correct the one-dimensional LUTs 2, 3, 4 respectively into a LUT 2' (the LUT 2 and an adder 16), a LUT 3' (the LUT 3 and an adder 17), and a LUT ' (the LUT 4 and an adder 18) which are capable of converting the outputted image data from the one-dimensional LUTs 2, 3, 4 into the target colorimetric values L*0, a*0, b*0. Consequently, the one-dimensional LUTs 2, 3, 4 can accurately be corrected in a short period of time depending on changes in the printing conditions.

According to the above illustrated embodiment, even if there is a measurement difference or error between the first colorimeter 21 (21A) to be corrected and the second colorimeter 22, the colorimetric value correcting table 24 which is installed in the color image output apparatus 10 for converting values measured by the first colorimeter 21 (21A) into values measured by the second colorimeter 22 allows color management based on the colorimetric values employed in the three-dimensional CM LUT 12.

In the above embodiment, the colorimetric value correcting table 24 comprises a table for converting the reflectivity Rλ1 into colorimetric values L*, a*, b*. However, the colorimetric value correcting table 24 may comprise a table for converting values measured by the first colorimeter 21 (21A) to be corrected directly into values measured by the second colorimeter 22. In this case, a color chart G', which is a color print G having color patches which represent substantially equally spaced R, G, B values of outputted image data R, G, B, used in step S12 is measured by the second colorimeter 22 to obtain a reference association (three-dimensional CM LUT 12) for converting colorimetric values L*, a*, b* into outputted image data R, G, B, and the color chart G' is measured by the first colorimeter 21 (21A) to obtain an association to be corrected (three-dimensional CM LUT) for converting colorimetric values L*, a*, b* into outputted image data R, G, B.

With this arrangement, when an arbitrary color is measured by the first colorimeter 21 (21A) to be corrected, its colorimetric values L*, a*, b* are converted into corresponding image data R, G, B using the association to be corrected (three-dimensional CM LUT) and volume interpolation, and the determined image data R, G, B are inputted to the reference association (three-dimensional CM LUT 12) to determine corresponding colorimetric values L*, a*, b* by way of volume interpolation. The determined colorimetric values L*, a*, b* are colorimetric values L*, a*, b* on the second colorimeter 22 which are converted from the colorimetric values L*, a*, b* measured by the first colorimeter 21 (21A).

According to the present invention, as described above, since an association between values measured by a first colorimeter and values measured by a second colorimeter, i.e., an association between colorimetric values of color patches of a color chart which are measured by a first colorimeter and a second colorimeter, is prepared in advance, colorimetric values measured by the first colorimeter can easily be converted into colorimetric values on the second colorimeter automatically through calculations, using the prepared association.

Further, according to the present invention, even if the colorimeter which is incorporated in the color image output apparatus or the external colorimeter which is connected on-line to the color image output apparatus and a colorimeter used to generate a three-dimensional CM LUT are different from each other, since a measurement difference or error between the colorimeters is corrected, one-dimensional LUTS for three hues for enabling the color image output apparatus to output desired colors can be corrected in a short period of time without the need for correction by way of fine adjustment based on professional knowledge.

Therefore, inasmuch as measured values outputted by the colorimeter which is incorporated in the color image output apparatus or the external colorimeter connected on-line to the color image output apparatus, either of which is for correcting gradations, and colorimetric values in the three-dimensional CM LUT for color matching are in accord with each other, the measured values agree with colors defined by the three-dimensional CM LUT for correcting gradations, so that the color image output apparatus has stable color reproducibility.

In the method of converting colorimetric values according to the present invention, a gray chart having gray patches kept within a visible wavelength range and also having a constant reflectivity irrespective of the wavelength is measured by the first colorimeter and also by the second colorimeter. An association between reflectivities at given wavelength intervals (d$\lambda$) in the visible wavelength range is determined as K$\lambda$. Colorimetric values X, Y, Z are determined according to the following equations:

$$X = k \int (x\lambda \cdot K\lambda \cdot R\lambda 1 \cdot S\lambda) d\lambda$$

$$Y = k \int (y\lambda \cdot K\lambda \cdot R\lambda 1 \cdot S\lambda) d\lambda$$

$$Z = k \int (z\lambda \cdot K\lambda \cdot R\lambda 1 \cdot S\lambda) d\lambda$$

where R$\lambda$1 is the reflectivity measured of a given gray chart by the first colorimeter, k a constant, x$\lambda$, y$\lambda$, z$\lambda$ color matching functions, S$\lambda$ the spectral power distribution of the observation light source. The integration range in the equations is the visible wavelength range. The colorimetric values X, Y, Z or colorimetric values L*, a*, b* in the CIELAB color space which are converted from the colorimetric values X, Y, Z are used as corrected colorimetric values of the first colorimeter. Therefore, the corrected colorimetric values are in accord with colorimetric values on the second colorimeter.

In order to convert colorimetric values outputted by the first colorimeter which is incorporated in the color image output apparatus or the first colorimeter which is provided outside and connected on-line to the color image output apparatus with respect to colorimetric values outputted by the second colorimeter, a relationship between reflectivities measured by the first colorimeter which is incorporated in the color image output apparatus or the first colorimeter which is provided outside and connected on-line to the color image output apparatus and the second colorimeter is determined for each measured wavelength, and the reflectivities measured by the first colorimeter which is incorporated in the color image output apparatus or the first colorimeter which is provided outside and connected on-line to the color image output apparatus are corrected into the reflectivities measured by the second colorimeter using the determined relationship. If the relationship between reflectivities is not employed, then a color chart having color patches which represent substantially equally spaced values of hues of outputted image data may be measured by the first colorimeter which is incorporated in the color image output apparatus or the first colorimeter which is provide outside and connected on-line to the color image output apparatus and also by the second colorimeter, and an association between colorimetric values measured of the outputted image data by the first colorimeter which is incorporated in the color image output apparatus or the first colorimeter which is provided outside and connected on-line to the color image output apparatus and colorimetric values on the second colorimeter may be obtained in advance.

Although a certain preferred embodiment of the present invention has been shown and described in detail, it should be understood that various changes and modifications may be made therein without departing from the scope of the appended claims.

What is claimed is:

1. A method of converting colorimetric values, comprising the steps of:

measuring a gray chart having equal gradations of hues of image data with a first colorimeter to obtain a measure reflectivity R$\lambda$1;

measuring a gray chart having one or more gray patches and having a constant reflectivity irrespective of the wavelength within a visible wavelength range at predeterimined wavelength intervals d$\lambda$, with a second colorimeter and said first colorimeter to obtain a reflectivity at each of the wavelength intervals;

determining colorimetric values X, Y, Z according to the equations:

$$X = k \int (x\lambda \cdot K\lambda \cdot R\lambda 1 \cdot S\lambda) d\lambda$$

$$Y = k \int (y\lambda \cdot K\lambda \cdot R\lambda 1 \cdot S\lambda) d\lambda$$

$$Z = k \int (z\lambda \cdot K\lambda \cdot R\lambda 1 \cdot S\lambda) d\lambda$$

where K$\lambda$ k is the ratio of the reflectivity measured by said first colorimeter to the reflectivity measured by said second colorimeter, k a constant, x$\lambda$, y$\lambda$, z$\lambda$ color matching functions, S$\lambda$ the spectral power distribution of an observation light source, and the integration range is said visible wavelength range; and using said colorimetric values X, Y, Z or colorimetric values L*, a*, b* in a CIELAB color space which are converted from said colorimetric values X, Y, Z as corrected colorimetric values of said first colorimeter.

2. A method according to claim 1, wherein hues of said image data comprise R, G, B.

3. A color image output apparatus for supplying imputted device-dependent image data to an expose recording unit through gradation converting means for converting gradations of the image data depending on printing conditions of a given printing press, and outputting a color print for use as a color proof from said exposure recording unit, comprising:

color converting means for outputting a color chart having a plurality of color patches which represent spaced values of said image data, from said exposure recording unit, and converting colorimetric values measured of said color chart by a second colorimeter into device-dependent image data;

a first colorimeter for measuring colorimeteric values of said color chart to obtain an association between measured colorimetric values and colorimetric values corresponding to said device-dependent image data;

colorimetric value correcting means for converting colorimetric values measured by said first colorimeter into colorimetric values on said second colorimeter, in order to equalize the colorimetric values measured by said first colorimeter with the colorimetric values on said second colorimeter; and means for supplying output data from said colorimetric value correcting means to said color converting means and correcting gradation converting characteristics of said gradation converting means with output data from said color converting means;

wherein said means comprises:
first means for outputting a gray chart having equal gradations of hues of the inputted image data of said gradation converting means from said exposure recording means;
second means for measuring colorimetric values of said gray chart with said first colorimeter, and producing measured colorimetric values L*, a*, b* by correcting the measured colorimetric values with said colorimetric value correction means; and
third means for inputting said measured colorimetric values L*, a*, b* and target colorimetric values L*0, a*0, b*0 to said color converting means, and adding differences ΔR, ΔG, ΔB between image data R0, G0, B0 of the hues corresponding to said target colorimetric values L*0, a*0, b*0 and image data R1, G1, B1 of the hues corresponding to said measured colorimetric values L*, a*, b*, to output data of the hues from said gradation converting means thereby to correct said gradation converting characteristics.

4. A color image output apparatus according to claim 3, wherein said second means comprises:
means for measuring a gray chart having one or more gray patches having a constant reflectivity irrespective of the wavelength within a visible wavelength range at predetermined wavelength intervals dλ, with a second colorimeter and said first colorimeter to obtain a reflectivity Rλ1 at each of the wavelength intervals, determining colorimetric values X, Y, Z according to the equations:

$$X=k\int(x\lambda\cdot K\lambda\cdot R\lambda 1\cdot S\lambda)d\lambda$$

$$Y=k\int(y\lambda\cdot K\lambda\cdot R\lambda 1\cdot S\lambda)d\lambda$$

$$Z=k\int(z\lambda\cdot K\lambda\cdot R\lambda 1\cdot S\lambda)d\lambda$$

where Kλ is the ratio of the reflectivity measured by said first colorimeter to the reflectivity measured by said second colorimeter, k a constant, xλ, yλ, zλ color matching functions, Sλ the spectral power distribution of an observation light source, and the integration range is said visible wavelength range, and generating said colorimetric value correcting means as correcting means for using said colorimetric values X, Y, Z or colorimetric values L*, a*, b* in a CIELAB color space which are converted from said colorimetric values X, Y, Z as corrected colorimetric values of said first colorimeter; and
means for measuring colorimetric values of said gray chart with said first colorimeter, measuring the reflectivity Rλ1 at predetermined wavelength intervals in said visible wavelength range, and inputting the measured reflectivity to said equations to produce said measured colorimetric values L*, a*, b*.

5. A color image output apparatus according to claim 3, wherein said first colorimeter is an external colorimeter connected on-line to the color image output apparatus.

6. A color image output apparatus according to claim 3, wherein said first colorimeter is a built-in colorimeter incorporated in the color image output apparatus.

7. A color image output apparatus according to claim 4, wherein said first colorimeter is a built-in colorimeter incorporated in the color image output apparatus.

8. A color image output apparatus according to claim 4, wherein said first colorimeter is an external colorimeter connected on-line to the color image output apparatus.

9. A color image output apparatus for supplying inputted device-dependent image data to an exposure recording unit through gradation converting means for converting gradations of the image data depending on printing conditions of a given printing press, and outputting a color print for use as a color proof from said exposure recording unit, comprising:
color converting means for outputting a color chart having a plurality of color patches which represent spaced values of said image data, from said exposure recording unit, and converting colorimetric values measured of said color chart by a second colorimeter into device-dependent image data;
colorimetric value correcting means for converting colorimetric values outputted by a first colorimeter into inputted colorimetric values of said color converting means; and
means for measuring a gray chart having one or more gray patches having a constant reflectivity irrespective of the wavelength within a visible wavelength range at predetermined wavelength intervals dλ, with said second colorimeter and said first colorimeter to obtain a reflectivity Rλ1 at each of the wave length intervals, determining xolorimetric values X, Y, Z according to the equations:

$$X=k\int(x\lambda\cdot K\lambda\cdot R\lambda 1\cdot S\lambda)d\lambda$$

$$Y=k\int(y\lambda\cdot K\lambda\cdot R\lambda 1\cdot S\lambda)d\lambda$$

$$Z=k\int(z\lambda\cdot K\lambda\cdot R\lambda 1\cdot S\lambda)d\lambda$$

where Kλ is the ratio of the reflectivity measured by said first colorimeter to the reflectivity measured by said second colorimeter, k a constant, xλ, yλ, zλ color matching functions, Sλ the spectral power distribution of an observation light source, and the intergration range is said visible wavelength range, and generating said colorimetric value correcting means to use said colorimetric values X, Y, Z or colorimetric values L*, a*, b* in a CIELAB color space which are converted from said colorimetric values X, Y, Z as corrected colorimetric values of said first colorimeter.

10. A color image output apparatus according to claim 9, wherein said device-dependent image data comprise image data R, G, B.

11. A color image output apparatus according to claim 9, wherein said first colorimeter is an external colorimeter connected on-line to the color image output apparatus.

12. A color image output apparatus according to claim 9, wherein said first colorimeter is a built-in colorimeter incorporated in the color image output apparatus.

13. A color image output apparatus for supplying inputted device-dependent image data to an exposure recording unit through gradation converting means for converting gradations of the image data depending on printing conditions of a given printing press, and outputting a color print for use as a color proof from said exposure recording unit, comprising:
color converting means for outputting a color chart having a plurality of color patches which represent spaced values of said image data, from said exposure recording unit, and converting colorimetric values measured of said color chart by a second colorimeter into device-dependent image data;
a first colorimeter for measuring colorimeteric values of said color chart to obtain an association between measured colorimetric values and colorimetric values corresponding to said device-dependent image data;

colorimetric value correcting means for converting colorimetric values measured by said first colorimeter into colorimetric values on said second colorimeter, in order to equalize the colorimetric values measured by said first colorimeter with the colorimetric values on said second colorimeter; and means for supplying output data from said colorimetric value correcting means to said color converting means and correcting gradation converting characteristics of said gradation converting means with output data from said color converting means;

wherein said means comprises:

first means for outputting a gray chart having equal gradations of hues of the inputted image data of said gradation converting means from said exposure recording means; and second means for measuring colorimetric values of said gray chart with said first colorimeter, and producing measured colorimetric values $L^*$, $a^*$, $b^*$ by correcting the measured colorimetric values with said colorimetric value correcting means.

\* \* \* \* \*